Dec. 30, 1947.                    C. P. KRUPP                    2,433,768
                                 INFLATABLE SUIT
                   Filed May 29, 1942            3 Sheets-Sheet 2
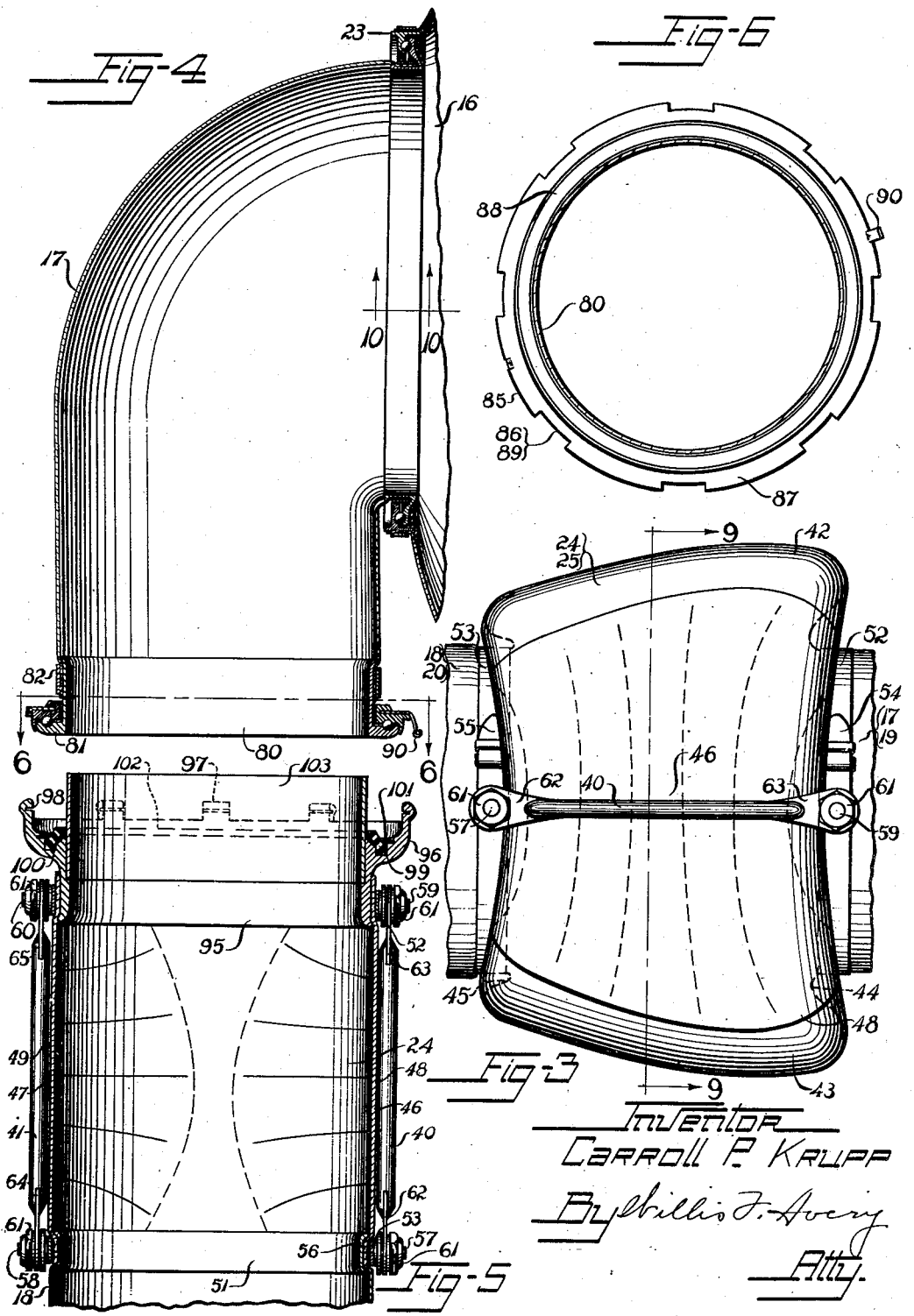
Inventor
Carroll P. Krupp
By Willis T. Avery
Atty.

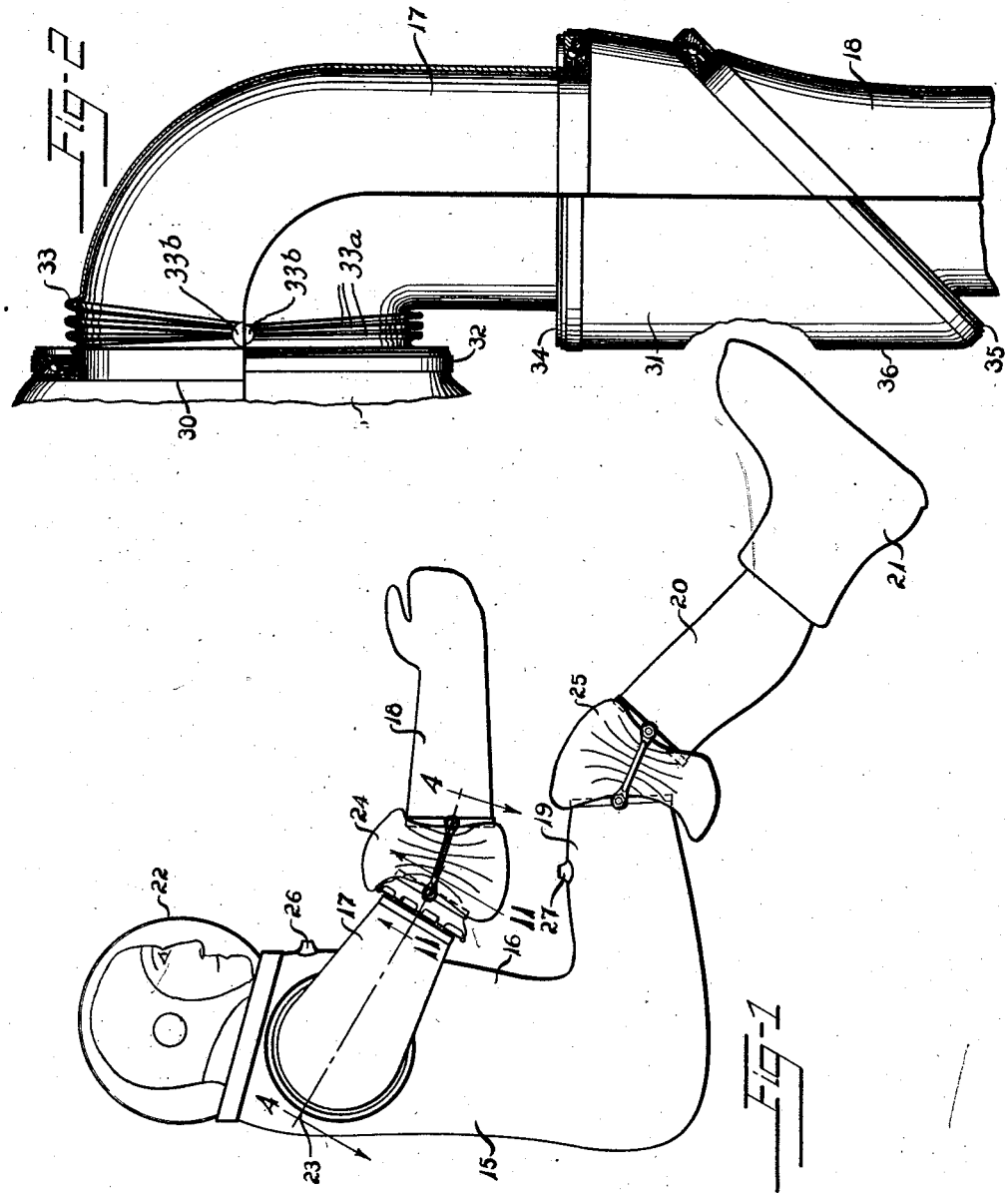

Dec. 30, 1947.   C. P. KRUPP   2,433,768
INFLATABLE SUIT
Filed May 29, 1942   3 Sheets-Sheet 3
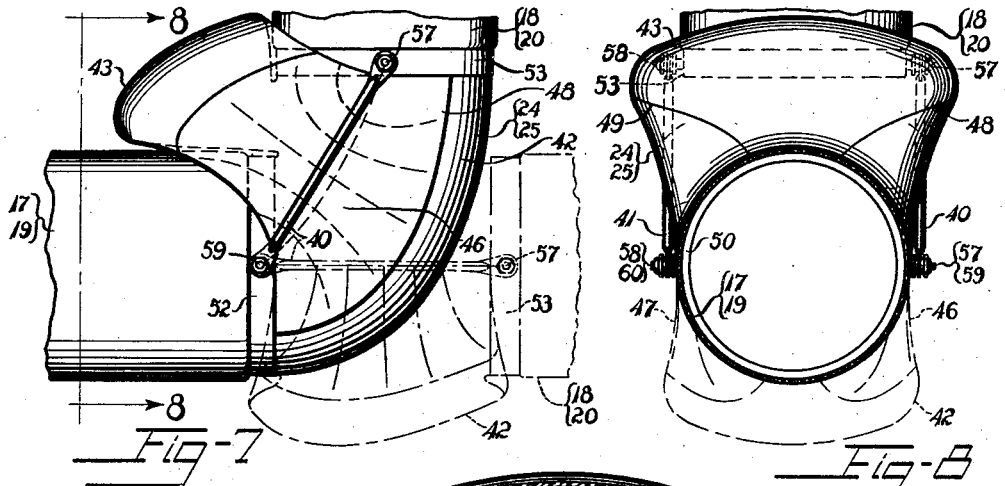
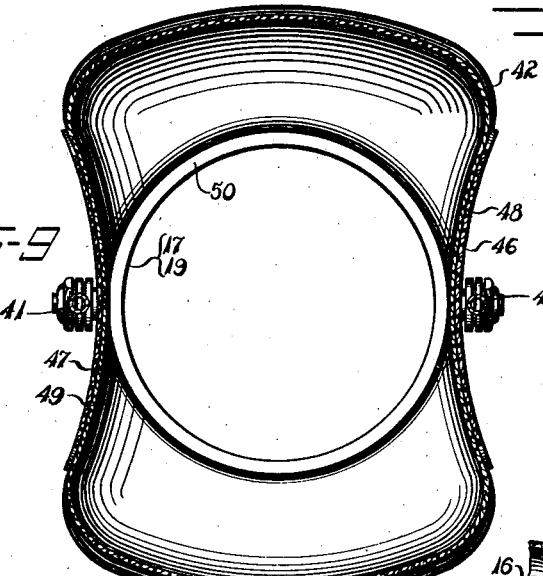
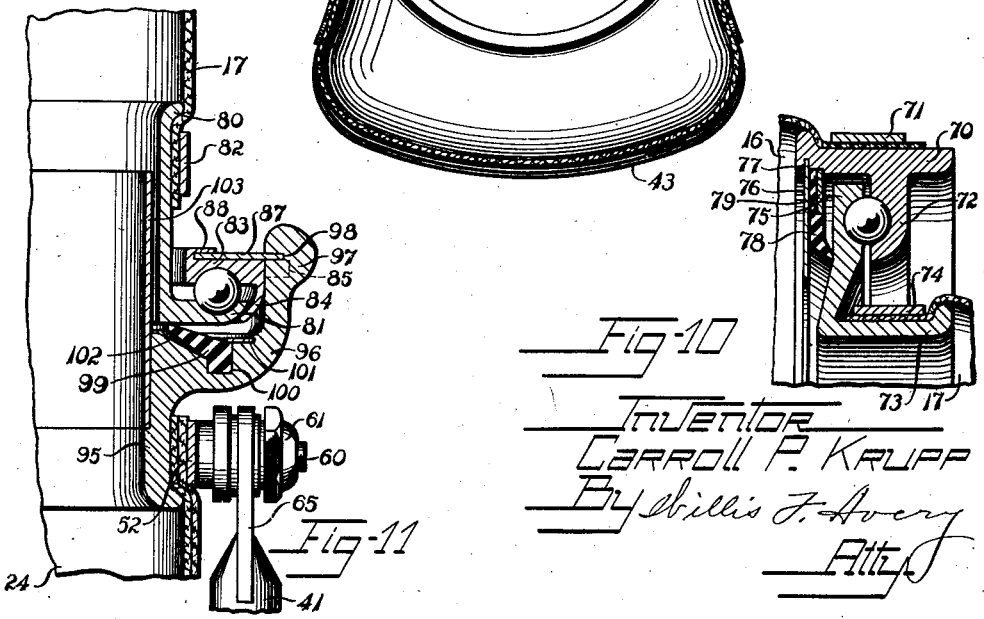
Inventor
Carroll P. Krupp
By Willis F. Avery
Atty.

Patented Dec. 30, 1947

2,433,768

UNITED STATES PATENT OFFICE 2,433,768

INFLATABLE SUIT

Carroll P. Krupp, Akron, Ohio, assignor to The B. F. Goodrich Company, New York, N. Y., a corporation of New York Application May 29, 1942, Serial No. 445,016

12 Claims. (Cl. 2—2.1)

This invention relates to an inflatable suit and more especially to a suit for use in conditions of high altitudes where the air density and pressure are low.

Flight at high altitudes, especially in the stratosphere region, beginning at approximately 22,000 feet and extending upwardly, has many advantages for civil and military aviation; but such flight has been limited, heretofore, by mechanical problems in the construction of the aircraft and by physiological problems for the crews and passengers. The use of an inflatable suit solves or aids in solving both of the said problems although primarily concerned with the physiological consideration involved as exemplified by lung alveolar oxygen pressure, aeroembolism or "bends," and body gas expansion. Furthermore, the use of an inflatable suit obviates the necessity of a pressurized cabin or chamber with its associated mechanical problems and weight addition to the aircraft with the corresponding reduction in performance characteristics of said aircraft. However, the problem is encountered of providing effective joints giving the desired degree of freedom, ease, and flexibility of movement by the wearer, this problem arising because of the inherent rigidity of the hollow members comprising the suit, which rigidity is caused by surface tension stresses established as a result of the inflation pressure therein.

An object of this invention is to provide a durable, light-weight, flexible-walled, inflatable suit having movable joints whereby maximum freedom of movement may be had by the wearer notwithstanding the stiffening of the walls by their distention from an internal pressure which exceeds that of the outer atmosphere, which internal pressure is necessary or desirable in conditions of high altitude, actual or simulated.

Another object of the invention is to provide a flexible joint construction suitable for an inflatable suit whereby maximum free movement of adjacent portions of said suit may be obtained with a minimum of effort.

A further object is to provide a movable joint with maximum turning or bending movement having simplicity of construction and providing for convenience of manufacture and assembly.

More specific objects are to provide a detachable movable joint capable of free movement and of withstanding internal pressure with negligible air leakage, and to provide a joint wherein the forces due to internal pressure which restrict movement of said joint are counter-balanced or neutralized thereby requiring minimum effort to bend the joint to desired positions and to maintain said positions readily.

Further objects of the invention are to provide a balanced flexible joint for forward and rearward swinging movement of adjacent portions of an inflatable suit and to provide a joint for unrestricted turning or rotating movement of said portions of the suit.

These and other objects and advantages of the invention will be apparent from the following description.

In the accompanying drawings, which form a part of this specification, and in which like numerals are employed to designate like parts throughout the same, Fig. 1 is a side view of an inflatable suit showing joints constructed in accordance with and embodying the invention.

Fig. 2 is a front elevation of an arm portion of an inflatable suit showing a modified construction of a movable shoulder joint and a movable elbow joint, parts being shown in section.

Fig. 3 is a side elevation of one of the flexible joints of Fig. 1, which Fig. 3 is a view of either the elbow joint of Fig. 1 omitting the associated rotatable joint shown therein, or the knee joint of Fig. 1.

Figs. 4 and 5 are a section taken along the line 4—4 of Fig. 1, parts being separated for the purpose of illustration.

Fig. 6 is a section taken along line 6—6 of Fig. 4.

Fig. 7 is a view like Fig. 3 but showing the joint when swung forwardly to a right angle position, as shown in full lines, from its straight position, the latter being indicated in broken lines.

Fig. 8 is a section taken along line 8—8 of Fig. 7.

Fig. 9 is a section taken along line 9—9 of Fig. 3 showing the flexible reinforcing means for the flexible joint.

Fig. 10 is a section taken along line 10—10 of Fig. 4, and

Fig. 11 is a sectional view taken along the line 11—11 of Fig. 1.

There are a number of characteristics and functions which an inflatable suit should desirably possess and be capable of performing to meet the requirements of extended, safe and satisfactory service in high altitudes by aircraft crews and others.

Such service may be exemplified by the pilot's operation of a commercial sub-stratosphere airliner or a military airplane wherein extensive flexibility and freedom of torso and/or limb movement is desirable to manipulate rapidly and conveniently the airplane controls and appurtenances with minimum human energy expenditure and maximum safety of flight.

The phenomenon that an inflated tubular element possesses great inherent rigidity due to surface tension stresses and resists effectively bending and flexure thereof, has made extremely difficult the successful solution of the problem of providing movable joints for an inflatable suit having maximum freedom of movement with minimum human energy expenditure.

The invention provides means for obtaining the desired maximum freedom and flexibility of movement of adjacent portions of the inflatable suit, whether said movement be turning or bending or both in combination. The invention provides also for a rotatable joint with sealing means readily capable of assembly and disassembly. Further, the invention provides for free and balanced relative forward and rearward swinging movement of adjacent portions of the inflatable suit by means of a flexible joint having a hollow element with outwardly bulged wall portions in the direction of said movement, the bulged portions changing in shape with variation in angularity of position of the adjacent portions.

It is desirable that pressure within the suit be maintained at a value such that the pressure upon the enclosed body of a wearer will correspond to an atmospheric pressure existing at a desired lower altitude so that objectionable physiological effects on the wearer are avoided; hence the suit including the joints should function satisfactorily under an appreciable range of pressures existing between the inside thereof and the outside atmosphere of high altitudes, actual or simulated.

In the illustrative embodiment of Figs. 1 and 3 to 11 provision is made for attaining these and other ends. Fig. 1 shows an inflatable suit 15 including joints permitting maximum freedom of movement by the wearer notwithstanding the stiffening of wall portions of said suit due to an internal pressure exceeding the outer pressure. The suit 15 includes a torso covering portion 16, sleeve or arm covering portions 17 and 18, and pants or leg covering portions 19 and 20, the walls of said portions being made from a suitable, impervious, flexible wall material, preferably a woven fabric having a resilient rubber impregnation or coating. A shoulder joint 23, an elbow joint 24, and a knee joint 25 attach movably the several portions of the suit and permit extensive freedom of movement by the wearer. All seams joining said portions are sealed to prevent air leakage and to withstand pressure. Aviation type boots 21 protect the wearer's feet encased in the leg portion 20 against the extreme cold of the stratosphere region. A helmet 22 of suitable shape having provision for vision is attached to the torso portion 16 to complete the enclosure of the wearer's body. Air under pressure is admitted into the suit through a suitable connection 26 and is exhausted to the atmosphere through a valve member 27 adjacent to the knee joint.

The joint illustrated in Fig. 3 may be used, for example, as an elbow joint 24 or as a knee joint 25. As hereinabove discussed, if the limb covering were provided simply as a tube of flexible material, the stiffness of the same resulting from inflation thereof would render bending, as at the knee or elbow, exceedingly difficult, although the flexibility of the material permits some give or distortion under twisting stresses which give is beneficial especially in the limb portions. In accordance with the invention, there is provided a number of constructional features which cooperate to produce the result of maximum ease of flexure throughout a wide range. The stiffness and resistance to bending existing in the inflated flexible covering may be overcome in part by changing the shape of the covering at the joint to provide an inwardly or an outwardly extending bulged portion, so that the continuity of covering stiffness is interrupted. The bag-like structure 24 and 25 of outwardly bulged shape provides this result, whereby the upper 17 and 19 and the lower 18 and 20 portions of the limb covering, themselves possessing considerable stiffness against bending by virtue of their inflated condition, are permitted to tilt with relation to the bulged portion somewhat in the manner, for example, in which a valve stem on an inflated tire inner tube is capable of tilting about the region of the inner tube where the stem joins it despite the inflated condition of the tube.

It is desirable, however, to provide for more extended freedom of movement of the limb beyond the limited range thus permitted. To this end there is provided means for restraining separating movement of the upper 17 and 19 and the lower 18 and 20 portions of the limb covering so as to relieve in a large measure the flexible material of the bag-like structure of stresses in its surface in the longitudinal direction of the covering; hence its flexibility is appreciably increased which facilitates the bending action throughout a much wider range.

I have found that maximum flexibility of the joint and ease of movement throughout an extremely wide range is made possible by restraining means including link elements 40 and 41 of a stiff or rigid nature pivoted at its ends to the lower covering portion 18 and 20 and to the upper covering portion 17 and 19. Preferably a link 40 and 41 is provided at each side of the bag-like structure for maximum stability during the bending movement through a large angle. Furthermore, it is desirable that the outwardly bulged wall portions 42 and 43 of the bag-like structure 24 and 25 have in section a substantially S-like curvature 44 and 45 in the region of their margins contiguous with the upper and lower covering portions whereby a smooth overlapping folding of the wall portions over the covering portions occurs when the joint is bent. This prevents effectively objectionable restriction of free movement due to jamming of the bulged wall portions between the upper and the lower limb covering portions. Flat sidewall portions 46 and 47 interconnecting the bulged wall portions 42 and 43 of the bag-like structure 24 and 25 further assist in providing a joint having maximum flexure and freedom of movement by promoting the aforesaid overlapping folding and the corresponding changes in shape of said bulged portions. The flattened sidewall portions have the advantage of restricting bulging of the bag in the sidewise directions of the joint, which resisting action promotes orderly bulging and folding of the bag in the desired directions of joint flexure, and further has the result of minimizing interference of the sides of the inflated bag with the links 40 and 41, which links may slide easily upon such sidewall portions as may be necessary to accommodate the swinging movement through a large angle of flexure of the joint.

A joint having these constructional features has the additional advantage of balanced bending movement. The wearer of the suit may bend the joint easily to a desired angular position and may maintain said angular position without continuously exerting force for such purpose. There is virtually no tendency of the joint to change position naturally and it retains an angular position until additional force is applied thereto.

Figs. 3, 7 and 8 illustrate the above-mentioned constructional features, the overlapping folding action of the outwardly bulged wall portions 42 and 43 and corresponding changes in shape of the latter, and the sliding action of the sidewalls 46 and 47 past the rigid link elements 40 and 41. Preferably the bag-like structure 24 and 25 may be made using four pieces of flexible material of suitable pattern to provide the form shown, these pieces being assembled, for example, by cementing or sewing or both. Furthermore a reinforcing element 48 and 49 as shown by Fig. 9 may be attached in a like manner to the sidewall portions 46 and 47 of the structure for providing further stiffness and to strengthen said portions. The ends of said structure are adhered by means of rubber cement or otherwise suitably secured in overlapping relation to the upper 17 and 19 and the lower 18 and 20 limb covering portions, the overlapped section of the ends and the covering portions being held securely clamped between inner ring elements 50 and 51 having an outer recessed face 56 and flat clamping bands 52 and 53 having fastening means 54 and 55, the bands registering with said recessed face. Oppositely disposed stud elements 57 to 60 having a shoulder and a threaded end portion are secured to the bands 52 and 53, for example, by spot welding, and provide means for hingedly connecting the rigid link elements 40 and 41 having flattened ends 62 to 65 with openings therein to the joint. The links are retained on the studs by a suitable lock nut 61 engaging with the threaded end portion of the studs, but are pivoted freely on the shoulder portion thereof.

When swinging the joint through an appreciable range of movement, as shown by Figs. 7 and 8, the bulged wall portion 43 in the direction of swinging is overlapped and folded smoothly over the upper 17 and 19 and the lower 18 and 20 limb covering portions without jamming therebetween, whereas the other bulged wall portion 42 of the bag-like structure changes to an elongated curved shape. The small amount of sliding action of the sidewall portions 46 and 47, which occurs opposite to the direction of swinging and past the rigid link elements 40 and 41, decreases somewhat the size of the bulged wall portion 43 between the limb covering portions and increases the space within the elongated curved shape portion 42, which prevents binding upon the limb of the wearer. Inasmuch as the rigid link elements 40 and 41 are hingedly connected through the stud elements 57 to 60 to the flat clamping bands 52 and 53, which unite the bag-like structure to the respective limb covering portions, the limb covering portions assume freely various angular positions with respect to each other and with respect to the link elements. Conversely the bulged wall portions 42 and 43 resume their original form and the sidewall portions 46 and 47 slide back to their normal position when swinging the joint back to its original position, which may be illustrated by Fig. 3.

An arm covering portion of the inflatable suit 15 is shown by Figs. 4 and 5 having embodiments of the joints 23 and 24 which enable the wearer to have wide ranges of arm movement with minimum human energy expenditure, even to the extent of permitting the wearer to move his arm to positions in back of his neck. In the shoulder joint illustrated by Figs. 4 and 10, the torso covering 16 may be adhered and sealed to the exterior surface of an annular ring element 70 by means of rubber cement and secured firmly in place thereto by a suitable clamping band or strap 71, the annular ring element having an inwardly extending flange to provide for a bearing race element 72. In a like manner the upper arm covering 17 may be secured by means of a strap 74 and by cementing to an annular element 73 having an outwardly extending flange to provide for a bearing race element 75 in juxtaposition with the other bearing element 72. The annular elements 70 and 73 are maintained in assembled relationship by means of a metal snap ring retainer 76 seating in an annular recess 77 in the interior surface of the element 70 adjacent to the bearing element 75 and by means of a rubber sealing ring 78 having a metal insert 79 which, as shown in Fig. 10 for example, limits movement of the element 73 including the bearing race element 75 toward the sealing ring 78, the sealing ring having a face contiguous with the retainer 76 and having an inwardly extending flange portion contiguous with the flange portion of the annular element 73 to provide for an air seal.

The lower portion of the upper arm covering 17 may be attached, as shown by Figs. 4, 6 and 11, to an annular sleeve element 80 by means of an adhesive and a clamping band 82, the element having an outwardly extending flange to provide for a bearing race element 81. Another bearing race element 83 in juxtaposition with the aforesaid race element 81 has a downwardly depending extension 84 formed to partially embrace the other race element 81 to restrain separating movement of the race elements, and has an outwardly extending flange portion 85 having a plurality of spaced-apart slots 86 in the periphery thereof. A lock ring 87 is retained in position adjacent the exterior face of the bearing element 83 by means of an overlapping flange portion 88 of the element 83 and is movable freely relative to the latter. The lock ring 87 has likewise a plurality of spaced-apart slots 89, which may be positioned in register with the bearing slots 86, when the ring is in an unlocked position, as shown by Figs. 4 and 6. A suitable fastening device may be provided to retain the ring 87 in a locked position thereby limiting movement of the bearing race elements 81 and 83 toward a sealing ring 99, the bearing element 81 being restrained also by the extension 84, and a dependent tab 90 may be utilized for turning the lock ring as required for locking purposes.

As hereinabove discussed the flexible joint 24 may be attached to the lower arm covering portion 18 and to an annular structure 95, as illustrated by Figs. 5 and 11, the structure being used in lieu of the inner ring element 50 to provide for movable joinder of the joint 24 with the upper arm covering 17. The structure 95 has a flange portion 96, which embraces the bearing race elements 81 and 83, and has spaced-apart projection elements 97, which register with the slots 86 and 89 of the lock ring 87 and the bearing element 83, each of the projection elements having a recess 98 for engagement with the lock ring 87. A rubber sealing ring 99, which is seated in an annular recess 100 in the flange portion 96 and retained in place by a flat lock ring 101, has an inclined portion 102, which contacts the surface of the bearing element 81 to provide for an air seal. A sleeve element 103 may be secured to the inner surface of the annular structure 95 for overlapping engagement with the member 80 thereby promoting better alignment when assembling the rotatable joint members 80 and 95 together.

When attaching the flexible joint 24 and the lower arm covering 18 to the upper arm covering 17, the sleeve element 103 is inserted into the annular element 80 opening and the projection elements 97 register with and extend through the slots 86 and 89 of the lock ring 87 and the bearing element 83. The lock ring is turned by means of the tab 99 to engage with the recesses 98 of the projection elements 97 and is locked in place, thereby effectively joining the flexible joint and the arm covering portions and providing for relative rotating movement of the latter without appreciable air leakage or pressure decrease within the suit.

Fig. 2 shows a portion of an inflatable suit having a rotatable shoulder joint 30 and a movable elbow joint 31, which permits movement of the arm of the wearer to the various positions that may be desirable in the use of the suit. The torso portion 16 adjacent the shoulder-arm body joint 30 is detachably secured to a rotatable annular structure 32, which is like the structure shown by Fig. 10, by a suitable adhesive and a clamping band means (see 71 in Fig. 10). Similarly a sleeve portion 17, which may have a flexible extensible bellows section 33 to assist in providing additional freedom of arm movement, the folds 33a of the bellows being joined by reinforcing patches 33b, 33b at opposite sides of the bellows as shown in Fig. 10 so that extension of the sleeve portion 17 under inflation is prevented yet flexure is permitted, is secured to the structure 32 and to a rotatable annular structure 34, which is a part of the elbow joint 31. Spaced-apart rotatable annular structures 34 and 35, each of which is like the structure shown by Fig. 10, and a flexible wall sleeve element 36 comprise the elbow joint, which serves to interconnect the upper arm portion 17 to the lower arm portion 18 whereby relative swinging and turning movement between said portions may be obtained. The structure 34 is perpendicular to the longitudinal axis of the sleeve portion 17, whereas the other annular structure 35 may be disposed preferably at an angle of 45 degrees thereto, thus providing for 90 degrees bending action of the arm at the elbow due to relative rotational movement of the portions. The element 36 connecting the structures 34 and 35, when under internal pressure and in a surface stressed condition, functions substantially as a rigid spacing means.

Normal use of the inflatable suit requires frequently the raising and lowering of the arm in combination with bending of the elbow of the wearer. In operation under such a condition the arm covering portions 17 and 18 may be freely raised or lowered by means of relative rotation between the portions 17 and 18 and the torso covering portion 16 through the turning movement of the annular member 32 shoulder joint, and elbow bending is permitted through relative rotational movement of the annular structures 34 and 35 of the elbow joint 31 with respect to each other and to the arm portions 17 and 18.

Variations may be made without departing from the scope of the invention as it is defined in the following claims.

I claim:

1. An inflatable high-altitude suit including a torso portion and a limb portion for maintaining the wearer under air pressure substantially greater than the surrounding air pressure while providing free flexible movement of the limb of the wearer, said portions comprising a torso covering of flexible wall material, a limb covering of flexible wall material including a flexible joint intermediate the length of said limb covering to provide for forward and rearward bending thereof, and an annular rotatable joint interconnecting said torso covering and said limb covering providing unlimited relative rotating movement between said coverings, said annular rotatable joint comprising a bearing including a pair of ring structures having opposed bearing faces and interposed anti-friction elements providing full-circle relative movement of said faces and including sealing means, whereby extensive and substantially free flexible movement of the limb portion relative to the torso portion is facilitated by the free rotation of said annular rotatable joint together with the bending of said flexible joint and the give of said flexible wall material.

2. An inflatable high-altitude suit including a torso portion and an arm portion for maintaining the wearer under air pressure substantially greater than the surrounding air pressure while providing free flexible movement of an arm of the wearer, said portions comprising a torso covering of flexible wall material, an arm covering of flexible wall material including a bellows joint having an end portion adjacent said torso covering and a flexible joint intermediate the length of said arm covering to provide for forward and rearward bending thereof, and an annular rotatable joint interconnecting said torso covering and said arm covering providing unlimited relative rotating movement between said coverings, said annular rotatable joint comprising a bearing including a pair of ring structures having opposed bearing faces and interposed anti-friction elements providing full-circle relative movement of said faces and including sealing means, whereby extensive and substantially free flexible movement of the arm portion relative to the torso portion is facilitated by the free rotation of said annular rotatable joint together with the bending of said bellows joint and said flexible joint and the give of said flexible wall material.

3. An inflatable high-altitude suit including a torso portion and an arm portion for maintaining the wearer under air pressure substantially greater than the surrounding air pressure while providing free flexible movement of an arm of the wearer, said portions comprising a torso covering of flexible wall material, an arm covering of flexible wall material including a bellows joint having an end portion adjacent said torso covering and an elbow joint comprising a pair of ring structures in intersecting planes and having relatively rotatable means for attaching said elbow joint to said arm covering and providing relative angular and unlimited rotating movement between portions of said arm covering, and an annular rotatable joint interconnecting said torso covering and said arm covering providing unlimited relative rotating movement between said coverings, said annular rotatable joint comprising a bearing including a pair of ring elements having opposed bearing faces and interposed anti-friction elements providing full-circle relative movement of said faces and including sealing means, whereby extensive and substantially free flexible movement of the arm portion relative to the torso portion is facilitated by the free rotation of said annular rotatable joint together with the bending of said bellows joint and the relative angular and unlimited rotating movement between portions of said arm covering at the region of said elbow joint and the give of said flexible wall material.

4. In an inflatable high-altitude suit for maintaining the wearer under air pressure substantially greater than the surrounding air pressure, a portion for incasing a part of the body of the wearer and having a joint therein for relative swinging movement of adjacent parts of said portion forwardly and rearwardly, said portion comprising a covering having a bag-like element of flexible wall material intermediate the length of and integral with said covering to provide for the relative swinging movement of said adjacent parts of said portion, said element having oppositely disposed front and back wall portions of outwardly bulged form in the direction of forward and rearward swinging movement and having sidewall portions relatively less outwardly bulged as compared to the first said wall portions, said sidewall portions extending longitudinally along side regions of said element coextensive with said front and back wall portions and between and interconnecting the front and back wall portions and including restraining means at said sidewall portions interconnecting and restraining longitudinal separating movement of said adjacent parts of said portion and restraining the relatively less bulged sidewall portions from outward bulging to promote movement of said adjacent parts of said portion in said direction by flexure of the first said wall portions while lateral compactness of said element is maintained under inflation of the suit and element.

5. In an inflatable high-altitude suit for maintaining the wearer under air pressure substantially greater than the surrounding air pressure, a limb receiving portion having a joint therein for relative swinging movement of adjacent parts of said portion forwardly and rearwardly, said portion comprising a limb covering having a bag-like element of flexible wall material intermediate the length of and integral with said limb covering to provide for the relative swinging movement of said adjacent parts of said portion, said element having oppositely disposed front and back wall portions of outwardly bulged form in the direction of forward and rearward swinging movement and having relatively flat sidewall portions extending longitudinally along side regions of said element coextensive with said front and back wall portions and between and interconnecting the first said wall portions and including restraining means at said sidewall portions interconnecting and restraining longitudinal separating movement of said adjacent parts of said limb portion and restraining said relatively flat sidewall portions from outward bulging to promote movement of said parts of the limb portion in said direction by flexure of the first said wall portions while lateral compactness of said element is maintained under inflation of the suit and element.

6. An inflatable high-altitude suit including a torso portion and an arm portion for maintaining the wearer under air pressure substantially greater than the surrounding air pressure while providing free natural shoulder and elbow flexing movements of the arm of the wearer, said portions comprising a torso covering of flexible wall material, an arm covering of flexible wall material including a flexible elbow joint intermediate the length of said arm covering to provide for forward and rearward swinging movement of parts of said arm covering connected by said joint, and an annular rotatable joint interconnecting said torso covering and said arm covering at the shoulder providing unlimited relative rotating movement between the coverings, said annular rotatable joint comprising a bearing including a pair of ring structures having opposed bearing faces and interposed anti-friction elements providing full-circle relative movement of said faces and including sealing means, and said flexible elbow joint comprising a bag-like member comprising flexible material having substantial fullness in front and back portions opposite each other in the direction of forward and rearward swinging movement to provide a forwardly projecting bulge in the front portion and a rearwardly projecting bulge in the back portion, said bag-like member having sidewall portions comprising said flexible material extending longitudinally along side regions of said member coextensive with the front and back bulged portions and between and interconnecting said front and back bulged portions, and means being provided to restrain said sidewall portions to substantially less bulged extent than said front and back bulged portions throughout the longitudinal extent of said flexible joint to promote swinging movement of said parts of the arm covering in said direction by flexure of said front and back bulged portions while lateral compactness of said flexible joint is maintained under inflation of the suit and flexible joint.

7. A flexible joint for connecting adjacent parts of an inflatable high-altitude suit for maintaining the wearer under air pressure substantially greater than the surrounding air pressure while providing for swinging movement of one of said parts forwardly and rearwardly relative to the other part, said joint comprising a bag-like member comprising flexible material having substantial fullness in front and back portions opposite each other in the direction of forward and rearward swinging movement to provide a forwardly projecting bulge in the front portion and a rearwardly projecting bulge in the back portion, said bag-like member having sidewall portions comprising said flexible material extending longitudinally along side regions of said member coextensive with the front and back bulged portions and between and interconnecting said front and back bulged portions, and means being provided to restrain said sidewall portions to substantially less bulged extent than said front and back bulged portions throughout the longitudinal extent of said joint to promote swinging movement of said parts in said direction by flexure of said front and back bulged portions while lateral compactness of the joint is maintained under inflation of the suit and joint.

8. A flexible joint as defined in claim 7 in which said bag-like member has open ends and in which said front and back bulged portions each consists of a reach of said flexible material extending from one of said ends to the other end and of greater length than the distance between said ends, said reach being arranged in a manner to be distended outwardly in a single continuous bulge between said ends.

9. A flexible joint for connecting adjacent parts of an inflatable high-altitude suit for maintaining the wearer under air pressure substantially greater than the surrounding air pressure while providing for swinging movement of one of said parts forwardly and rearwardly relative to the other part, said joint comprising a bag-like member comprising flexible material having substantial fullness in front and back portions opposite each other in the direction of forward and rearward swinging movement to provide a forwardly projecting bulge in the front portion and a rearwardly projecting bulge in the back portion, said bag-like member having sidewall portions comprising said flexible material of lesser fullness than the bulged portions and extending longitudinally along side regions of said member coextensive with the front and back bulged portions and between and interconnecting said front and back bulged portions, and means additional to said flexible material comprising elements mounted longitudinally along said joint in close proximity to said sidewall portions throughout their longitudinal extent for limiting longitudinal separating movement of said parts of the suit and restraining said sidewall portions to substantially less outwardly bulged extent than said front and back bulged portions throughout the longitudinal extent of said joint to promote swinging movement of said parts of the suit in said direction by flexure of said front and back bulged portions while lateral compactness of the joint is maintained under inflation of the suit and joint.

10. A flexible joint for connecting adjacent parts of an inflatable high-altitude suit for maintaining the wearer under air pressure substantially greater than the surrounding air pressure while providing for swinging movement of one of said parts forwardly and rearwardly relative to the other part, said joint comprising a flexible bag-like structure having open ends and front and back wall portions opposite each other in the direction of forward and rearward swinging movement, said front wall portion being of forwardly projecting bulged form and said back wall portion being of rearwardly projecting bulged form, said bag-like structure having sidewall portions extending longitudinally along side regions of said structure coextensive with the front and back bulges and between and interconnecting said front and back wall portions, said sidewall portions being relatively flat and including means substantially restraining said sidewall portions against outward bulging as compared to said bulged form of said front and back wall portions throughout the longitudinal extent of said structure, and connecting means comprising elements mounted longitudinally along said joint in close proximity to said sidewall portions throughout their longitudinal extent for limiting longitudinal separating movement of said parts of the suit and additionally restraining said sidewall portions to substantially less outwardly bulged extent than said front and back wall portions throughout the longitudinal extent of said joint to promote swinging movement of said parts of the suit in said direction by flexure of the bulged front and back wall portions while lateral compactness of the joint is maintained under inflation of the suit and joint.

11. A flexible joint as defined in claim 10 in which said elements of said connecting means comprise links of substantially rigid material hingedly connected to said parts of the suit at positions intermediate said front and back wall portions of said bag-like structure.

12. A flexible joint as defined in claim 10 in which said connecting means includes a pair of ring means at said ends of said bag-like structure for connecting said ends to said parts of the suit, one of said ring means comprising a rotatable structure to provide for relative turning movement between said bag-like structure and the adjacent part of the suit, and in which said front and back wall portions of the bag-like structure each consists of a reach of flexible material extending from one of said ring means to the other ring means and of greater length than the distance between said pair of ring means, said reach having marginal portions at each said ring means arranged in reversely curved overlapping relation with each said ring means providing for overlapping folding of said reach at said marginal portions during said swinging movement and said reach being arranged in a manner to be distended outwardly in a single continuous bulge between said marginal portions.

CARROLL P. KRUPP.

REFERENCES CITED

The following references are of record in the file of this patent:

UNITED STATES PATENTS

| Number | Name | Date |
|---|---|---|
| 236,858 | Tasker | Jan. 18, 1881 |
| 989,530 | Macduffee | Apr. 11, 1911 |
| 1,146,781 | Bowdoin | July 20, 1915 |
| 1,305,656 | Long | June 3, 1919 |
| 1,359,132 | Walters | Nov. 16, 1920 |
| 1,902,697 | Ellingsen | Mar. 21, 1933 |
| 1,938,829 | Hamer | Dec. 12, 1933 |
| 1,991,601 | Lasaux | Feb. 19, 1935 |

FOREIGN PATENTS

| Number | Country | Date |
|---|---|---|
| 209,839 | Great Britain | Jan. 21, 1924 |

OTHER REFERENCES

Ser. No. 437,449, Richou (A. P. C.), published May 11, 1943.